United States Patent
Ellison et al.

(10) Patent No.: US 12,205,075 B2
(45) Date of Patent: Jan. 21, 2025

(54) SYSTEMS AND METHODS FOR INVENTORY MANAGEMENT

(71) Applicant: WALMART APOLLO, LLC, Bentonville, AR (US)

(72) Inventors: Benjamin R. Ellison, San Francisco, CA (US); Ravi Kumar Dalal, Dallas, TX (US); Monisha Elumalai, Dallas, TX (US); Yilun Chen, Rogers, AR (US)

(73) Assignee: Walmart Apollo, LLC, Bentonville, AR (US)

(*) Notice: Subject to any disclaimer, the term of this patent is extended or adjusted under 35 U.S.C. 154(b) by 751 days.

(21) Appl. No.: 17/196,823

(22) Filed: Mar. 9, 2021

(65) Prior Publication Data
US 2022/0292454 A1 Sep. 15, 2022

(51) Int. Cl.
*G06Q 10/0875* (2023.01)
*G06N 20/00* (2019.01)
*G06V 10/30* (2022.01)
*G06V 20/10* (2022.01)

(52) U.S. Cl.
CPC ......... *G06Q 10/0875* (2013.01); *G06N 20/00* (2019.01); *G06V 10/30* (2022.01); *G06V 20/10* (2022.01)

(58) Field of Classification Search
CPC .... G06Q 10/0875; G06N 20/00; G06V 10/30; G06V 20/10; G06V 20/52; G06V 20/62
See application file for complete search history.

(56) References Cited

U.S. PATENT DOCUMENTS

| | | | |
|---|---|---|---|
| 10,706,386 | B2 | 7/2020 | Trivelpiece |
| 2017/0193430 | A1* | 7/2017 | Barreira Avegliano ..................... G06V 20/52 |
| 2017/0255899 | A1 | 9/2017 | Taira |
| 2017/0286773 | A1 | 10/2017 | Skaff |
| 2017/0286901 | A1* | 10/2017 | Skaff .................... G06V 10/751 |
| 2020/0273013 | A1 | 8/2020 | Garner |
| 2022/0164607 | A1* | 5/2022 | Almazan ............. G06F 18/2415 |

FOREIGN PATENT DOCUMENTS

WO 2019140091 A1 7/2019
WO 2020210825 A1 10/2020

* cited by examiner

*Primary Examiner* — Fahd A Obeid
*Assistant Examiner* — Reva R Moore
(74) *Attorney, Agent, or Firm* — Foley IP Law, PLLC

(57) ABSTRACT

In some embodiments, apparatuses and methods are provided herein useful to inventory management. In some embodiments, an inventory management system comprises a mobile device comprising an image capture device configured to capture an image and a communications transceiver configured to transmit the image, and a control circuit configured to receive, from the mobile device, the image, detect, within the image, the first sign and the second sign, identify, based on the first sign, a product associated with the first sign, identify, based on the second sign, a location of the product storage unit, associate, in a database, an indication of the product associated with the first sign and the location of the product storage unit.

20 Claims, 4 Drawing Sheets

SYSTEMS AND METHODS FOR INVENTORY MANAGEMENT

TECHNICAL FIELD

This invention relates generally to inventory management and, more specifically, inventory tracking.

BACKGROUND

Proper inventory management in a retail facility is important for both the customer and the retailer. For example, if a product is improperly located, the customer may be frustrated when he or she cannot find it. If the customer cannot find the product, he or she will not be able to purchase the product, resulting in a lost sale for the retailer. Additionally, if a customer is placing an order for in-store pick up, if products are not properly located employees picking the products may not be able to find the products or require significant time to find the products. Currently, many retailers rely on periodic inventories of their retail facilities. For example, once yearly a retailer may endeavor to inventory every item in a store and perform smaller inventories every quarter. Unfortunately, these inventories are time consuming and expensive. Further, while these inventories can provide an accurate snapshot of the products maintained by the retail facility and/or their locations, the infrequency with which they are performed do not aid customer and employee daily interactions with products.

BRIEF DESCRIPTION OF THE DRAWINGS

Disclosed herein are embodiments of systems, apparatuses, and methods pertaining inventory management. This description includes drawings, wherein.

Figure 1B:
FIG. 1B depicts a price sign 112, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to inventory management. In some embodiments, an inventory management system comprises a mobile device, the mobile device comprising an image capture device, wherein the image capture device comprises a sensor configured to capture an image of a product storage unit, and a communications transceiver, wherein the communications transceiver is configured to transmit the image of the product storage unit, wherein the image of the product storage unit includes indicia, wherein the indicia indicate a first sign and a second sign included in the image of the product storage unit, and a control circuit, wherein the control circuit is communicatively coupled to the mobile device via a network, the control circuit configured to receive, from the mobile device, the image of the product storage unit, detect, within the image of the product storage unit, the first sign and the second sign included in the image of the product storage unit, identify, based on the first sign, a product associated with the first sign, identify, based on the second sign, a location of the product storage unit, associate, in a database, an indication of the product associated with the first sign and the location of the product storage unit.

As previously discussed, proper inventory management is important to retail facilities. Proper inventory management allows retailers to best serve their customers and can increase sales. Unfortunately, many retailers suffer from a lack of inventory accuracy. For example, some retailers track locations of products within the retail facility on the sales floor and/or in a stockroom. Oftentimes, the stored locations for products are inaccurate. For example, customers may select a product from a shelf, carry the item in the tail facility and then discard the products in locations other than where the products were retrieved when they no longer want the items. Similarly, employees may move products when changing a store layout and fail to record the new locations for the products. While many retailers conduct inventories of products, these inventories are infrequent, time consuming, and expensive. Accordingly, a need exists for systems, methods, and apparatuses that can aid in inventory management of products on a more frequent and/or less time-consuming basis.

Figure 1C:
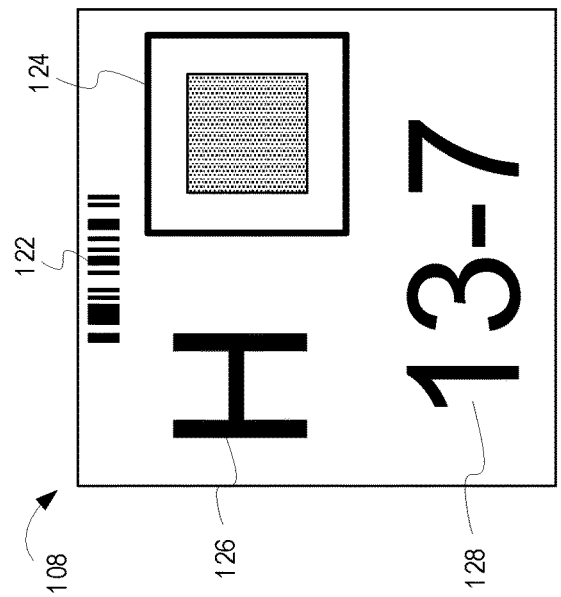
FIG. 1C depicts a location tag 108, according to some embodiments.

Described herein are systems, methods, and apparatuses that seek to minimize, if not eliminate, product location inaccuracies. In one embodiment, an employee captures an image of a product storage unit via a mobile device. The product storage unit includes signs. The signs are indicative of the products located on the product storage unit and a location of the product storage unit. The signs are identified and thus the products located on the product storage unit and the location of the product storage unit are identified. The system uses this information to update a database to include associations between products and locations. Because the employee captures the image via his or her mobile device, such inventory management tasks can be performed quickly and regularly (e.g., on demand or as the employee stocks items or traverses the retail facility), increasing the likelihood that the stored locations of products are accurate. The discussion of FIGS. 1A-1C provide an overview of such a system.

Figure 1A:
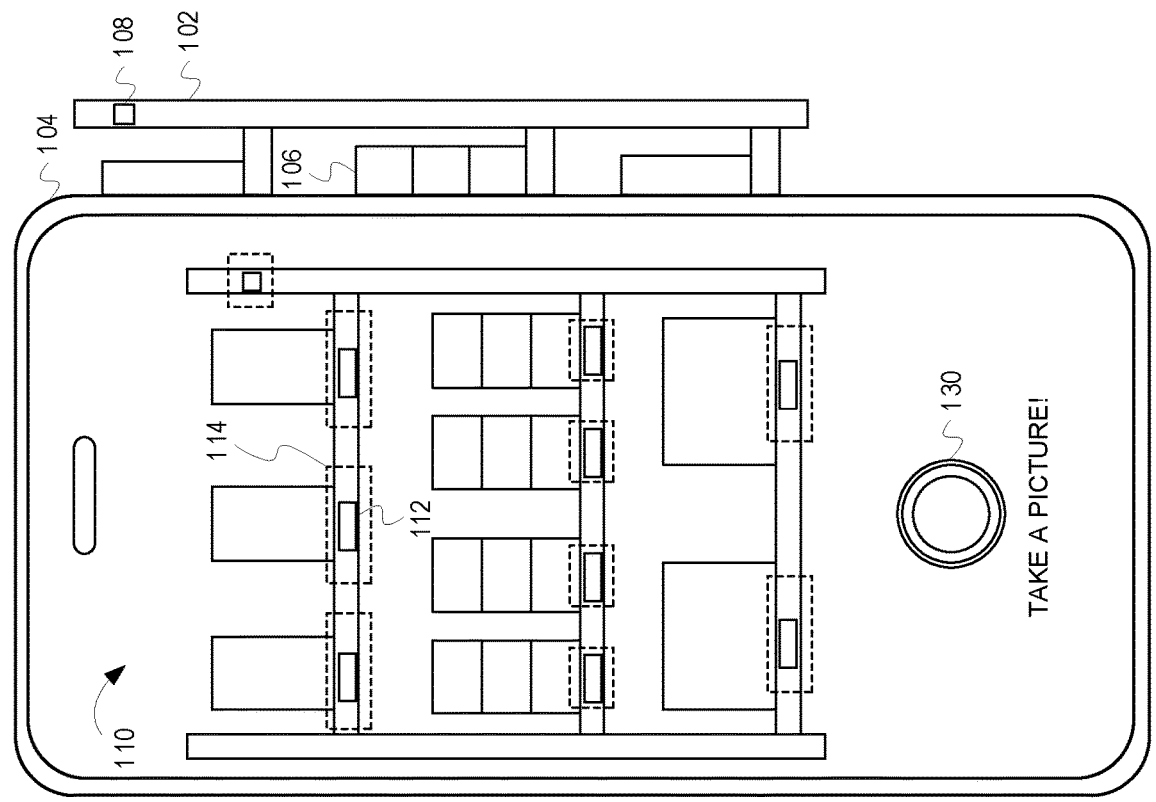
FIG. 1A depicts a mobile device 104 presenting an image 110 of a product storage unit 102 and indicia, according to some embodiments.

FIG. 1A depicts a mobile device 104 presenting an image 110 of a product storage unit 102 and indicia, according to some embodiments. An employee has captured the image 110 of the product storage unit 102 via the mobile device 104. The mobile device 104 includes a control 130 that allows the employee to capture images. For example, the control 130 can be a hard button or a soft button. The image 110 can be a still image or a video image. The product storage unit 102 houses products 106 and includes signs. As depicted in the example show in FIG. 1A, the product storage unit 102 includes a first sign 112 and a second sign 108. The first sign 112 and the second sign 108 can be of any suitable type. For example, the signs can indicate types of products 106, prices of the products 106, information associated with the products 106, locations of the products 106 and/or the product storage unit 102, etc. In the example depicted in FIG. 1A, the first sign 112 identifies one or more of the products 106 and the second sign 108 identifies a location of the product storage unit 102. This specific example of the first sign 112 and the second sign 108 is described in more detail with respect to FIGS. 1B and 1C.

The image of the product storage unit 102 also includes indicia 114. The indicia indicate the first sign 112 and the second sign 108. In one embodiment, the mobile device 104 superimposes the indicia 114 on the image 110. The indicia 114 can be used to aid the employee in capturing the image 110. For example, the indicia 114 can help the employee ensure that the signs included on the product storage unit 102 are captured in the image 110. As depicted in FIG. 1A, each of the signs includes an indicium, though such is not required. The indicia can take any suitable form. For example, the indicia can include boxes, shading, highlighting, segmentation maps, etc. surrounding or otherwise marking the signs.

As previously discussed, some of the signs can be used to identify a product. Such signs can be price signs, inventory signs, signs including item descriptions, etc. With respect to this disclosure, signs that can be used to identify products will generally be referred to as "price signs." One such example of a price sign 112 is depicted in FIG. 1B. The example price sign 112 depicted in FIG. 1B includes a visual indicator 120, a price indicator 116, and a product indicator 118. Though the example price sign 112 depicted in FIG. 1B includes the visual indicator, 120, the price indicator 116, and the product indicator 118, price signs including greater or fewer fields can be used, as desired. For example, a price sign including only the product identifier can be used in some instances.

The visual indicator 120 includes a plurality of markers (also referred to as "markings") positioned in a linear arrangement. For example, the markings can be rectangular in shape to enhance readability by machine. In one form, the markers can function in a binary manner, where each marker of the visual indicator represents either a "0" or a "1" (i.e., whether the marker is shaded or empty). The markings can indicate any desired information, such as an identification number (e.g., a product identifier), timing information, price information, etc. Greater discussion of visual indicators can be found in U.S. Provisional Patent Application No. 62/980,537 filed Feb. 24, 2020 titled SYSTEMS AND METHODS FOR VISUAL IDENTIFIERS and PCT Application Number PCT/US21/19255 filed Feb. 23, 2021 titled SYSTEMS AND METHODS FOR VISUAL IDENTIFIERS both incorporated by reference herein in their entirety. Because the visual indicator 120 indicates an identification number for a product, the price sign 112 can be used to identify the product associated with the price sign 112. The price sign 112 can be affixed to the product storage unit 102 and/or the products 106.

As previously discussed, some of the signs can be used to identify locations of the products 106 and/or the product storage unit 112. One such example is a location tag 108, an example of which is depicted in FIG. 1C. The example location tag 108 depicted in FIG. 1C includes a barcode 122, an alphabetic code 126, a finder pattern 124, and a numeric code 128. Though the example location tag 108 depicted in FIG. 1C includes fields for the barcode 122, the alphabetic code 126, the finder pattern 124, and the numeric code 128, location tags generally can include greater or fewer fields, as well as different information in the fields, as desired. The barcode 122 can include any desired information, such as an indication of a location, a product, a type of structure, timing information, etc. The alphabetic code 126 can include any desired information, such as a category, department, aisle, etc. The finder pattern 124 can be of any suitable type and is used by an image recognition program to locate and/or identify the location tag 108. The numeric code 128 can include any suitable information, such as an aisle, shelf, bin, etc. Because the location tag 108 includes location information, the location tag 108 can be used to identify a location of the location tag 108 and thus the products 106 and/or the product storage unit 102. The location tag 108 can be affixed to the product storage unit 102 and/or the products 106.

Figure 2:
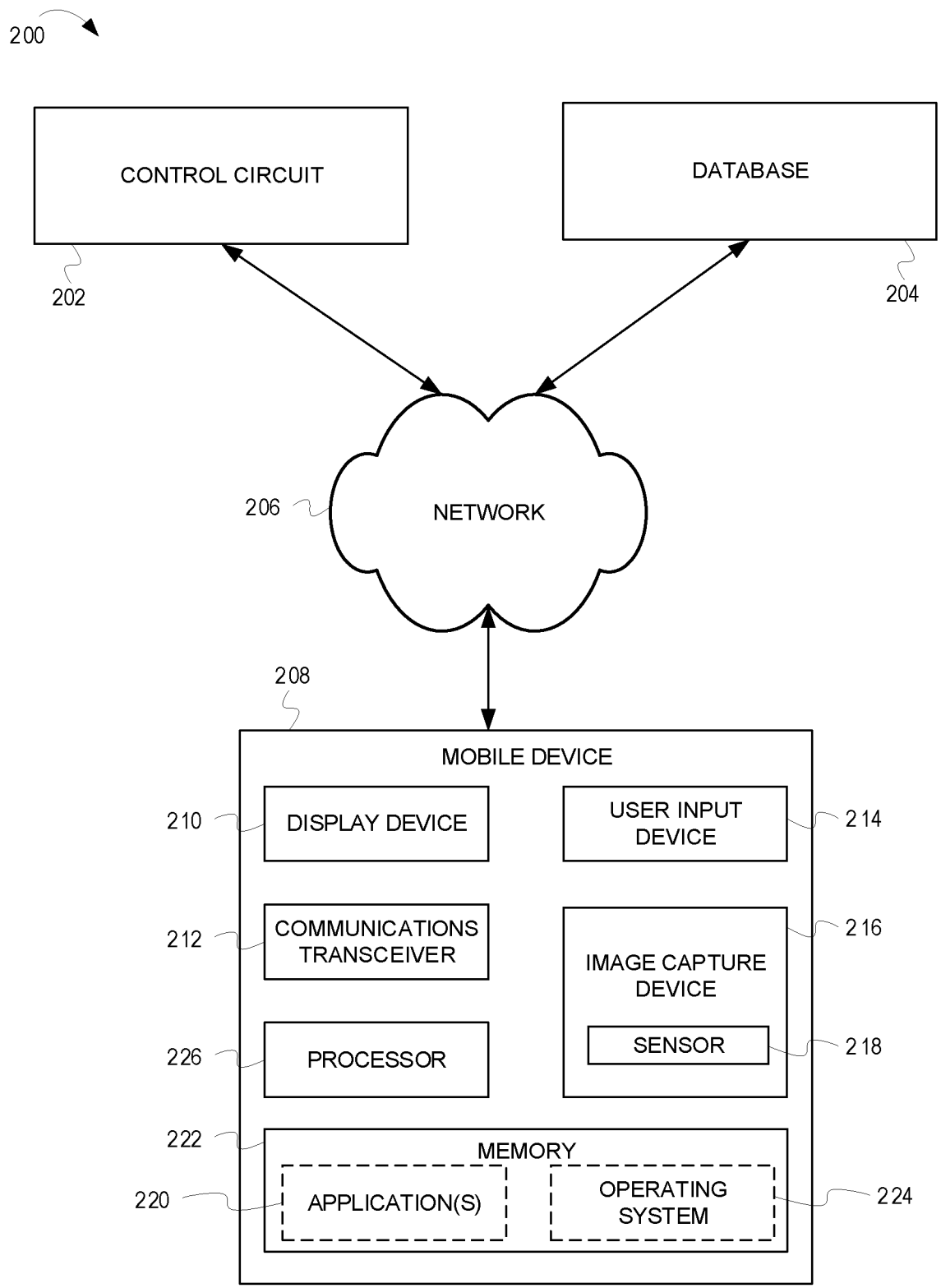
FIG. 2 is a block diagram of a system 200 for inventory management, according to some embodiments.

While the discussion of FIGS. 1A-1C provides background information regarding capturing image of product storage units, the discussion of FIG. 2 provides additional information regarding inventory management using the images captured.

FIG. 2 is a block diagram of a system 200 for inventory management, according to some embodiments. The system 200 includes a control circuit 202, a database 204, a network 206, and a mobile device 208. The control circuit 202, database 204, and mobile device 208 are communicatively coupled via the network 206. Accordingly, the network 206 can be of any suitable type. For example, the network 206 can include a local area network (LAN) and/or wide area network (WAN), such as the Internet, and include wired and/or wireless links.

The database 204 generally stores inventory information for a retail facility. With respect to this disclosure, the database 204 includes indications of products and locations within the retail facility and stores associations between the indications of the products and the locations within the retail facility. Accordingly, the database 204 can be of any suitable type, such as a relational database or NoSQL database. Additionally, the database 204 can include any other desired information, such as product information, product prices, inventory quantities, promotional information, etc.

The mobile device 208 is used by an employee to capture images. Accordingly, the mobile device 208 can be of any suitable type, such as a smartphone, a tablet computer, a laptop computer, an inventory management device (e.g., a device provided by the retail facility dedicated to inventory management tasks), etc. The mobile device 208 generally comprises a display device 210, a communications transceiver 212, a user input device 214, an image capture device 216, a processor 226, and memory 222. The processor 226 executes executable code stored in the memory 222. For example, the executable code stored in the memory 222 can include application(s) 220 and an operating system 224. The application(s) 220 can include any desired applications, such as those installed by a manufacturer of the mobile device 208 and/or applications installed by a user of the mobile device 208, such as an end user or an intermediary user. In one embodiment, the application(s) 220 include an inventory management application. The inventory management application is configured to be executed by the mobile device 208, for example, by the processor 226. When executed by the mobile device 208, the inventory management application can cause the mobile device 208 to perform functions, such as those described herein and with respect to FIG. 3. For example, the inventory management application, when executed by the mobile device 208, can cause the mobile device 208 to present a user interface from which users can interact with the mobile device, capture images (e.g., of product storage units), view the images, utilize the various functionalities available through the mobile device and/or access external systems to acquire additional information, data and/or utilize functionality provided from remote systems (e.g., via one or more computer and/or communication networks 206). Additionally, in some embodiments, the inventory management application, when executed, can generate indicia for the images and augment the images to include the indicia. The inventory management application can work in concert with the operating system 224, firmware and/or any other of the application(s) 220 to cause the mobile device to perform tasks and/or control physical components of the mobile device (e.g., display device 210, image capture device 216, audio system, vibration system, sensor systems, other such system or a combination of two or more such systems of the mobile device). For example, the inventory management application can work in concert with a camera application to control the image capture device 216 to capture images. Additionally, though the discussion herein refers to the use of an application, the application need not be an application dedicated to inventory management tasks. For example, the mobile device can be used to access inventory management tasks and/or information via a general purpose application, such as part of an operating system of the mobile device or a web browser executed by the mobile device.

The image capture device 216 includes a sensor 218 (e.g., an imaging sensor) configured to capture images of product display units. The user input device 214 allows a user to command the mobile device 208 to take actions, such as capturing the images. Accordingly, the user input device 214 can take any suitable form, and include one or more of touchscreens, buttons, joysticks, mice, trackpads, etc. The display device is configured to present the images of the product storage units and indicia. In some embodiments, the mobile device 208 augments the images to include the indicia. In such embodiments, the mobile device 208 generates the indicia and can present the image including indicia in real (or near real) time (e.g., as the user moves the mobile device relative to the product storage unit) and/or after the user has captured the image. In order to generate the indicia, the mobile device can process the image to detect the signs. The communications transceiver 212 is configured to transmit and/or receive data over the network 206. For example, the communications transceiver 212 transmits the images of the product storage units to the control circuit 202 via the network 206.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 generally processes the images of the product storage units received from the mobile device 208 and updates associations between products and locations in the database 204. The control circuit 202 processes the images to identify the products associated with the signs and the location of the product storage unit. In some embodiments, the control circuit 202 isolates the signs from the image of the product storage unit before the identification process. Such embodiments may allow the system to operate more efficiently and/or quickly, as only a portion of the image (i.e., the signs) need to be analyzed. Alternatively, the control circuit 202 can process the entire image. In embodiments in which the control circuit 202 isolates the signs from the image, the control circuit 202 detects the signs within the image. The control circuit 202 can detect the signs within the image based on image recognition or any other suitable computer vision technology. In one embodiment, the control circuit 202 utilizes a machine learning algorithm to detect the signs from within the image. By one approach, the control circuit 202 may use a neural network model to detect the signs from within the image. In some implementations, the neural network model may be based, at least in part, on a training neural network (e.g., deep neural network, lightweight neural network, a lightweight convolutional neural network, a lightweight MobileNet, Google-Net, visual Geometry Group, etc.) using the inventory management information. Further, in some embodiments, the control circuit can adapt, improve, retrain, etc. the machine learning model over time based on feedback received from the mobile device 208 and/or users. The control circuit can utilize finder patterns, like those depicted in FIGS. 1B and 1C, to aid in detecting the signs in the image. However, such is not required. For example, in embodiments in which the signs are not specifically designed to be computer-readable and/or do not include finder patterns, the control circuit 202 can detect the signs based on learned shapes, textual patterns, colors etc. As another example, in some embodiments, the control circuit 202 can preprocess the image by detecting the signs and generating the indicia. In such embodiments, the control circuit 202 can transmit the indicia, as well as locations for the indicia, to the mobile device 208 for presentation with the image.

After detecting the signs from within the image, the control circuit 202 crops the signs from the image. For example, the control circuit 202 can crop the signs from the image by removing extraneous portions (i.e., non-sign portions) of the image or by creating a new data file that contains only the signs. In some embodiments, before the control circuit 202 identifies the products associated with the signs and/or the locations, the control circuit 202 can preprocess the image. For example, the control circuit 202 can preprocess the image by adjusting the color of the image, rotating the image, cropping the image, performing noise reduction on the image, etc. Such techniques be employed to aid the control circuit 202 in performing image and/or text recognition on the signs.

Ultimately, the control circuit identifies the products associated with the signs and locations indicated by the signs. As previously discussed, the signs can take any suitable form and include any desired symbols, characters, colors, etc. In one specific example, the signs include prices signs, as depicted in FIG. 1B, including visual indicators. In such embodiments, the control circuit 202 can crop the visual indicator from the price sign for analysis. The control circuit 202 then reads each marker of the visual indicator. In one embodiment, the control circuit 202 resizes the visual indicator to a predetermined size, such that each marker is of a standard width. The control circuit 202 can then analyze the visual indicator by analyzing each marker with a known step width. That is, if each marker is N pixels wide, the control circuit 202 can step through the visual indicator looking, for example, near the center of each marker to determine if the marker represents a "0" or a "1" (i.e., is whether the marker is empty or shaded). The control circuit 202 reads the visual indicator to determine the product associated with the price sign.

Similarly, the control circuit 202 analyses the signs to identify a location of the product storage unit. Again, the signs can take any suitable form and include any desired symbols, colors, characters, etc. In one specific example, the signs include locations tags, as depicted in FIG. 1C. In such embodiments, the control circuit 202 analyzes the locations tags via text recognition (e.g., optical character recognition ("OCR")) to read the location tags.

After identifying the products associated with the signs and the location of the product storage unit, the control circuit 202 associates the indications of the products associated with the signs and the location of the product storage unit in the database 204. The control circuit 202 can associate the products and the location in the database 204 by transmitting an indication of the association to the database 204, transmitting indications of the products and the location to the database, writing data to the database 204, etc. In some embodiments, the control circuit 202 can also remove old associations from, and update new associations in, the database 204.

Figure 3:
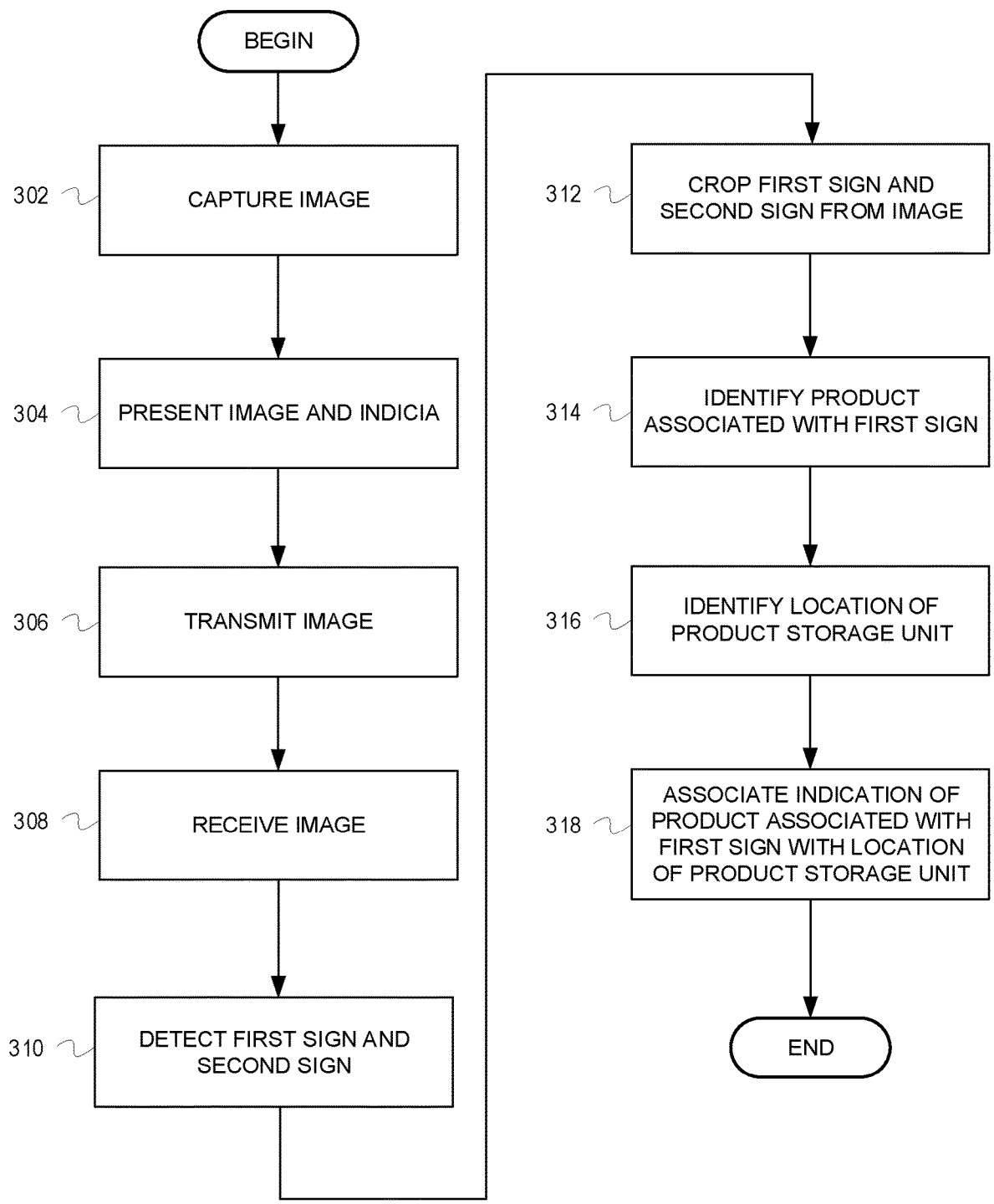
FIG. 3 is a flow chart depicting example operations for inventory management.

While the discussion of FIG. 2 provides additional detail regarding a system for associating products and locations in a database, the discussion of FIG. 3 describes example operations of such a system.

FIG. 3 is a flow chart depicting example operations for inventory management. The flow begins at block 302.

At block 302, an image is captured. For example, a mobile device can capture the image. In one embodiment, an application configured to be executed on the mobile device causes the mobile device to capture the image. The image includes (i.e., "is of") a product storage unit. The product storage unit can be any fixture in a retail facility (i.e., any fixture on a sales floor, in a stockroom, etc.) capable of housing, supporting, or otherwise holding one or more products. The image includes one or more signs. The signs can be of any suitable type. For example, the signs can be intended for customer use and/or employee use and contain human-readable and/or machine-readable markings. The signs can be affixed to products or the product storage unit and/or be located near the products or product storage unit. Further, the image can be a static image (e.g., a digital photograph), a combination of several images, and/or a video. The flow continues at block 304.

At block 304, in some embodiments, the image and indicia are presented. In one embodiment, the application configured to be executed on the mobile device causes presentation of the image and the indicia via a display device of the mobile device. The indicia are markings on the image that indicate the locations of the signs in the image. For example, the indicia can be bounding boxes, shading, highlighting, etc. that are included in the image. In one embodiment, the mobile device generates the indicia and superimposes the indicia on the image. The indicia can act as an aid to the user in ensuring that the signs can be identified and/or are included in the image. The flow continues at block 306. It is noted that, in some embodiments, the operations of block 304 may not be performed and, in such embodiments, the flow continues at block 306.

At block 306, the image is transmitted. For example, the mobile device can transmit the image to a control circuit. In one embodiment, the application configured to be executed on the mobile device can cause the image to be transmitted via a communications transceiver of the mobile device. The mobile device includes a communications transceiver. The communications transceiver transmits the image to the control circuit via a network (e.g., a communications network). The flow continues at block 308.

At block 308, the image is received. For example, the control circuit can receive the image from the mobile device via the network. The flow continues at block 310.

At block 310, a first sign and a second sign are detected. For example, the control circuit can detect the first sign and the second sign from within the image. Though recited as only a first sign and a second sign, it should be noted that one or both of the first sign and the second sign can include more than one sign. For example, the control circuit may detect several instances of a first type of sign (e.g., a price sign, product information sign, product identification sign, etc.) and one or more instances of a second type of sign (e.g., a sign including location information). In one embodiment, the control circuit detects the signs based on a machine learning algorithm. Additionally, or alternatively, some or all of the first sign and the second sign can include finder patterns and the control circuit can detect the signs based on the finder patterns. The flow continues at block 312.

At block 312, in some embodiments, the first sign and the second sign are cropped from the image. For example, the control circuit can crop the first sign and second sign from the image of the product storage unit. The control circuit can crop the first sign and second sign from the image by removing extraneous portions of the image, extracting the portions of the image including the signs from the image, etc. The flow continues at block 314. It is noted that, in some embodiments, the operations of block 312 are not preformed and, in such embodiments, the flow continues at block 314.

At block 314, a product associated with the first sign is identified. For example, the control circuit can identify the product associated with the first sign. The control circuit identifies the product associated with the first sign by analyzing the image (i.e., the portion of the image that was cropped including the first sign). If the first sign includes human-readable text, the control circuit can analyze the image using text recognition. As another example, if the first sign includes an image of the product, the control circuit can analyze the image by performing image recognition to identify the product. As another example, if the first sign includes a machine-readable code (e.g., a one- or two-dimensional barcode, a visual indicator, etc.), the control circuit can analyze the sign by reading the machine-readable code. The control circuit can identify the product associated with the first sign based on data stored in a database (e.g., an inventory database, a product information database, etc.). The flow continues at block 316.

At block 316, a location of the product storage unit is identified. For example, the control circuit can identify the location of the product storage unit. The control circuit identifies the location of the product storage unit by analyzing the image (i.e., the portion of the image that was cropped including the second sign). If the second sign includes human-readable text, the control circuit can analyze the image using text recognition. As another example, if the second sign includes a machine-readable code (e.g., a one- or two-dimensional barcode, a visual indicator, etc.), the control circuit can analyze the sign by reading the machine-readable code. The flow continues at block 318.

At block 318, an indication of the product associated with the first sign and the location of the product storage unit are associated. For example, the control circuit can associate the indication of the product associated with the first sign and the location of the product storage unit in a database. The control circuit can associate the indication of the product and the location of the product storage unit by transmitting the indication of the product and an indication of the location to the database, writing data (i.e., the association) in the database, etc.

Figure 4:
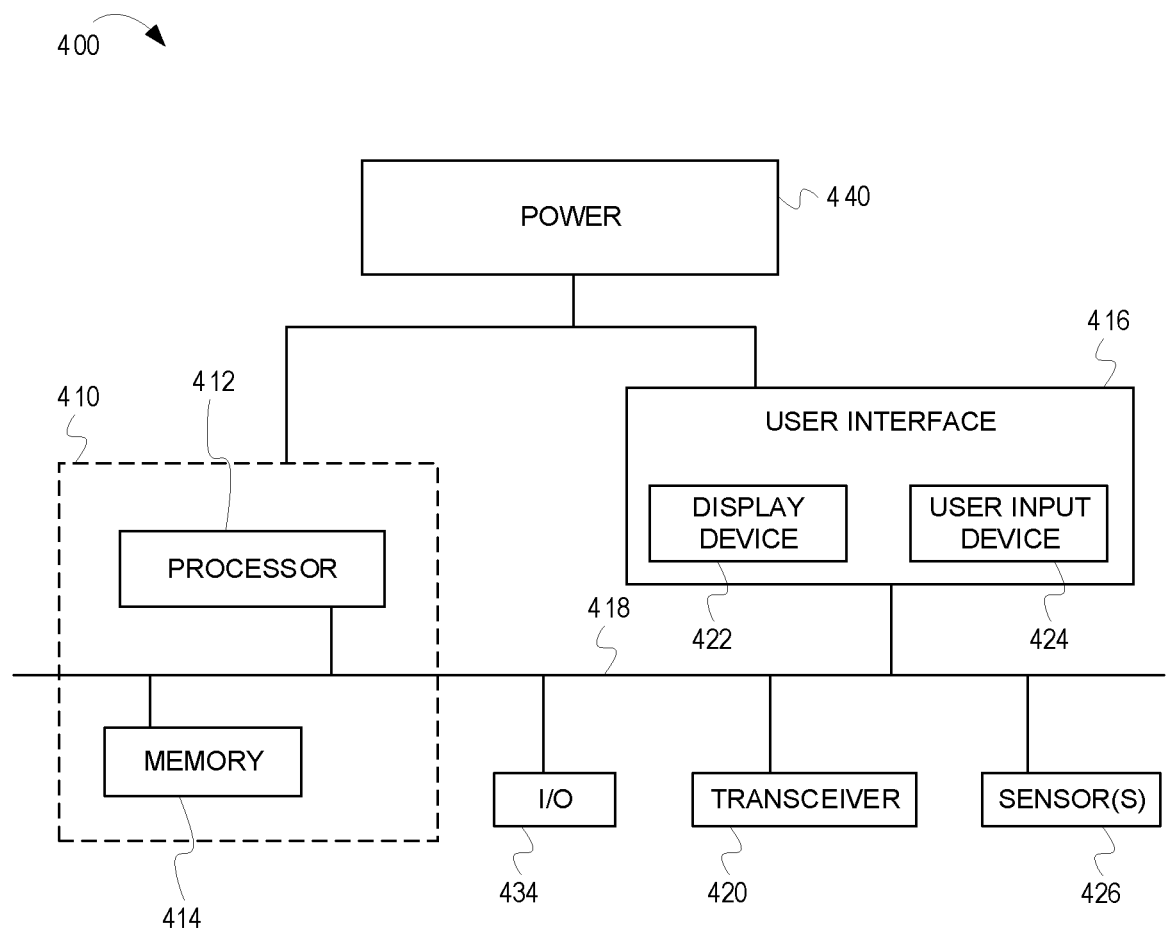
FIG. 4 is a block diagram of a system 400 that may be used for implementing any of the components, circuits, circuitry, systems, functionality, apparatuses, processes, or devices of the system 200 of FIG. 2, and/or other above or below mentioned systems or devices, or parts of such circuits, circuitry, functionality, systems, apparatuses, processes, or devices, according to some embodiments.

FIG. 4 is a block diagram of a system 400 that may be used for implementing any of the components, circuits, circuitry, systems, functionality, apparatuses, processes, or devices of the system 200 of FIG. 2, and/or other above or below mentioned systems or devices, or parts of such circuits, circuitry, functionality, systems, apparatuses, processes, or devices, according to some embodiments. The circuits, circuitry, systems, devices, processes, methods, techniques, functionality, services, servers, sources and the like described herein may be utilized, implemented and/or run on many different types of devices and/or systems. For example, the system 400 may be used to implement some or all of the control circuit, the mobile device, one or more of the databases, and/or other such components, circuitry, functionality and/or devices. However, the use of the system 400 or any portion thereof is certainly not required.

By way of example, the system 400 may comprise a control circuit or processor 412, memory 414, and one or more communication links, paths, buses or the like 418. Some embodiments may include one or more user interfaces 416, and/or one or more internal and/or external power sources or supplies 440. The control circuit 412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 412 can be part of control circuitry and/or a control system 410, which may be implemented through one or more processors with access to one or more memory 414 that can store commands, instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 400 may be used to implement one or more of the above or below, or parts of, components, circuits, systems, processes and the like.

The user interface 416 can allow a user to interact with the system 400 and receive information through the system. In some instances, the user interface 416 includes a display device 422 and/or one or more user input device 424, such as buttons, touchscreen, track ball, keyboard, mouse, etc., which can be part of or wired or wirelessly coupled with the system 400. Typically, the system 400 further includes one or more communication interfaces, ports, transceivers 420 and the like allowing the system 400 to communicate over a communication bus, a distributed computer and/or communication network (e.g., a local area network (LAN), wide area network (WAN) such as the Internet, etc.), communication link 418, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) ports 434 that allow one or more devices to couple with the system 400. The I/O ports can be substantially any relevant port or combinations of ports, such as but not limited to USB, Ethernet, or other such ports. The I/O interface 434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 426 to provide information to the system and/or sensor information that is communicated to another component, such as the central control system, a delivery vehicle, etc. The sensors 426 can include substantially any relevant sensor, such as distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, imaging system and/or camera, other such sensors or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The system 400 comprises an example of a control and/or processor-based system with the control circuit 412. Again, the control circuit 412 can be implemented through one or more processors, controllers, central processing units, logic, software and the like. Further, in some implementations the control circuit 412 may provide multiprocessor functionality.

The memory 414, which can be accessed by the control circuit 412, typically includes one or more processor-readable and/or computer-readable media accessed by at least the control circuit 412, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit 412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network. The memory 414 can store code, software, executables, scripts, data, content, lists, programming, programs, log or history data, user information, customer information, product information, and the like. While FIG. 4 illustrates the various components being coupled together via a bus, it is understood that the various components may actually be coupled to the control circuit and/or one or more other components directly.

In some embodiments, an inventory management system comprises an application configured to execute on a mobile device, the application when executed on the mobile device configured to cause an image capture device of the mobile device to capture an image of a product storage unit, wherein the image capture device comprises a sensor configured to capture an image of a product storage unit and cause transmission, via a communications transceiver of the mobile device, of the image of the product storage unit, wherein the image of the product storage unit includes indicia, wherein the indicia indicate a first sign and a second sign included in the image of the product storage unit, and a control circuit, wherein the control circuit is communicatively coupled to the mobile device via a network, the control circuit configured to receive, from the mobile device, the image of the product storage unit, detect, within the image of the product storage unit, the first sign and the second sign included in the image of the product storage unit, identify, based on the first sign, a product associated with the first sign, identify, based on the second sign, a location of the product storage unit, associate, in a database, an indication of the product associated with the first sign and the location of the product storage unit.

In some embodiments, an apparatus and a corresponding method performed by the apparatus comprises capturing, via a sensor of an image capture device of a mobile device, an image of a product storage unit, transmitting, via a communications transceiver, the image of the product storage unit, causing capture, by an application configured to be executed on a mobile device via a sensor of an image capture device of the mobile device, an image of a product storage unit, causing transmission, by the application configured to be executed on the mobile device via a communications transceiver, the image of the product storage unit, wherein the image of the product storage unit includes indicia, wherein the indicia indicate a first sign and a second sign included in the image of the product storage unit, receiving, from the mobile device via a network at a control circuit, the image of the product storage unit, detecting, by the control circuit from within the image of the product storage unit, the first sign and the second sign included in the image of the product storage unit, identifying, by the control circuit based on the first sign, a product associated with the first sign, identifying, by the control circuit based on the second sign, a location of the product storage unit, associating, by the control circuit in a database, an indication of the product associated with the first sign and the location of the product storage unit.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An inventory management system, the inventory management system comprising:
   an application configured to execute on a mobile device, the application when executed on the mobile device configured to:
   cause an image capture device of the mobile device to capture an image of a product storage unit, wherein the image capture device comprises a sensor configured to capture an image of a product storage unit; and
   cause transmission, via a communications transceiver of the mobile device, of the image of the product storage unit, wherein the image of the product storage unit includes indicia, wherein the indicia indicate a first sign and a second sign included in the image of the product storage unit; and
   a control circuit, wherein the control circuit is communicatively coupled to the mobile device via a network, the control circuit configured to:
   receive, from the mobile device, the image of the product storage unit;
   detect, within the image of the product storage unit, the first sign and the second sign included in the image of the product storage unit;
   isolate, from the image of the product storage unit, the first sign and the second sign to remove extraneous portions of the image not including the first sign and the second sign;
   create a new data file comprising the first sign and the second sign isolated from the image;
   crop, from the first sign, a visual indicator depicting a product identifier, wherein the crop removes all portions of the image outside of the cropped area;
   identify, based on the visual indicator depicting a product identifier, a product associated with the first sign;
   crop, from the second sign, a visual indicator depicting a product location, wherein the crop removes all portions of the image outside of the cropped area;
   identify, based on the visual indicator depicting a product location, a location of the product storage unit; and associate, in a database, an indication of the product associated with the first sign and the location of the product storage unit.

2. The inventory management system of claim 1, wherein the application when executed on the mobile device is further configured to:
generate the indicia; and
augment the image of the product storage unit to include the indicia.

3. The inventory management system of claim 2, wherein the application when executed on the mobile device is further configured to:
process the image of the product storage unit; and
locate, within the image of the product storage unit, the first sign and the second sign.

4. The inventory management system of claim 1, wherein the indicia include one or more of shading, highlighting, and segmentation maps.

5. The inventory management system of claim 1, wherein the first sign is a price sign comprising a price indicator and a product indicator, and the second sign is a location tag comprising a barcode, a finder pattern, an alphabetic code, and a numeric code.

6. The inventory management system of claim 5, wherein the visual indicator comprises a plurality of markers in linear arrangement including a pair of markers, data markers, and timing markers.

7. The inventory management system of claim 1, wherein the control circuit detects the first sign and the second sign via a machine learning algorithm.

8. The inventory management system of claim 7, wherein the machine learning algorithm recognizes text sections in the image of the product storage unit, and wherein the identification of the product associated with the first sign and the identification of the location of the product storage unit is based on an analysis of the text sections.

9. The inventory management system of claim 1, wherein the control circuit is further configured to:
preprocess, before the identification of the product associated with the first sign and the location of the product storage unit, the image of the product storage unit, wherein the preprocessing includes noise reduction of the image of the product storage unit.

10. The inventory management system of claim 9, wherein the preprocessing includes color adjustment of the image of the product storage unit.

11. A method for inventory management, the method comprising:
causing capture, by an application configured to be executed on a mobile device via a sensor of an image capture device of the mobile device, an image of a product storage unit;
causing transmission, by the application configured to be executed on the mobile device via a communications transceiver, the image of the product storage unit, wherein the image of the product storage unit includes indicia, and wherein the indicia indicate a first sign and a second sign included in the image of the product storage unit;
receiving, from the mobile device via a network at a control circuit, the image of the product storage unit;
detecting, by the control circuit from within the image of the product storage unit, the first sign and the second sign included in the image of the product storage unit;
isolating, from the image of the product storage unit, the first sign and the second sign to remove extraneous portions of the image not including the first sign and the second sign;
create a new data file comprising the first sign and the second sign isolated from the image;
cropping, from the first sign, a visual indicator depicting a product identifier, wherein the cropping removes all portions of the image outside of the cropped area;
identifying, by the control circuit based on the visual indicator depicting a product identifier, a product associated with the first sign;
cropping, from the second sign, a visual indicator depicting a product location, wherein the cropping removes all portions of the image outside of the cropped area;
identifying, by the control circuit based on the visual indicator depicting a product location, a location of the product storage unit; and
associating, by the control circuit in a database, an indication of the product associated with the first sign and the location of the product storage unit.

12. The method of claim 11, further comprising:
generating, by the application configured to be executed on the mobile device, the indicia; and
augmenting, by the application configured to be executed on the mobile device, the image of the product storage unit to the include the indicia.

13. The method of claim 12, further comprising:
processing, by the application configured to be executed on the mobile device, the image of the product storage unit; and
locating, by the application configured to be executed on the mobile device within the image of the product storage unit, the first sign and the second sign.

14. The method of claim 11, wherein the indicia include one or more of shading, highlighting, and segmentation maps.

15. The method of claim 11, wherein the first sign is a price sign comprising a price indicator and a product indicator, and the second sign is a location tag comprising a barcode, a finder pattern, an alphabetic code, and a numeric code.

16. The method of claim 15, wherein the visual indicator comprises a plurality of markers in linear arrangement including a pair of markers, data markers, and timing markers.

17. The method of claim 11, wherein the control circuit detects the first sign and the second sign via a machine learning algorithm.

18. The method of claim 17, wherein the machine learning algorithm recognizes text sections in the image of the product storage unit, and wherein the identification of the product associated with the first sign and the identification of the location of the product storage unit is based on an analysis of the text sections.

19. The method of claim 11, further comprising:
preprocessing, by the control circuit before the identifying the product associated with the first sign and the identifying the location of the product storage unit, the image of the product storage unit, wherein the preprocessing includes noise reduction of the image of the product storage unit.

20. The method of claim 19, wherein the preprocessing further includes color adjustment of the image of the product storage unit.

* * * * *